United States Patent [19]
Jackson et al.

[11] 3,955,728
[45] May 11, 1976

[54] HANDLEBAR BAG

[76] Inventors: W. Shaun Jackson, 809 Sycamore, Ann Arbor, Mich. 48104; Leslie Eric Bohm, 29560 Rutherland North, Southfield, Mich. 48076

[22] Filed: May 28, 1974

[21] Appl. No.: 473,342

[52] U.S. Cl. .............................. 224/31; 224/30 A; 224/36; 150/33
[51] Int. Cl.² ........................................... B62J 7/00
[58] Field of Search ............. 224/30 R, 30 A, 31, 224/32 R, 36, 43, 44; 150/28 R, 1, 33; 190/58

[56] References Cited
UNITED STATES PATENTS

| | | | |
|---|---|---|---|
| 599,120 | 2/1898 | Coolidge | 224/30 A |
| 610,288 | 9/1898 | Streeper | 224/36 X |
| 1,801,443 | 4/1931 | Mesinger | 224/32 R |
| 2,552,443 | 5/1951 | Molinari | 224/30 R X |

FOREIGN PATENTS OR APPLICATIONS

| | | | |
|---|---|---|---|
| 354,860 | 8/1905 | France | 224/36 |
| 244,975 | 6/1947 | Switzerland | 224/36 |
| 551,770 | 1/1923 | France | 224/32 R |

*Primary Examiner*—Albert J. Makay
*Attorney, Agent, or Firm*—Krass & Young

[57] ABSTRACT

A handlebar bag for a cycle is cylindrical in shape and has a pair of elongated straps affixed to points at the two ends of the top of the bag. The strips have hook and loop fasteners at the free ends and are adapted to be wrapped around the handlebars of the cycle and reattached to a strip of dissimilar hook and loop fastener affixed to the surface of the bag between the points of attachment of the two straps. A pair of elastic shock cords have their free ends attached to spaced points at the bottom of the bag and carry hooks at their free ends which are adapted to attach to the front axle area to stabilize the bag when the top straps are wrapped around the handlebars. By joining the two free ends of the straps together with an intermediate connecting strap having hook and loop fasteners on its ends the bag may be employed as a shoulder bag.

10 Claims, 3 Drawing Figures

HANDLEBAR BAG

BACKGROUND OF THE INVENTION

1. Field of the Invention

This invention relates to an accessory bag adapted to be supported below the handlebars of a cycle or alternatively used as a shoulder bag.

2. Prior Art

Small bags adapted to be secured between the oppositely extending handlebar sections of a bicycle or motorcycle have been popular accessories for many years. The cyclist can conveniently transport small items such as sun glasses or sweaters in the bag and may conveniently remove or insert articles from time to time without demounting the cycle. These bags typically employ a pair of straps with buckle fasteners at the end to secure the bag beneath the handlebars.

Handlebar bags which are formed of a flexible fabric are generally lower in cost and more convenient in use than rigid bags but create certain problems because the influence of the contents of the bag on its shape and its disposition relative to the handlebars. Also, the strap systems used to retain previous bags to the handlebars have been so constructed so as to obstruct the free use of the bars and interfere with the use of safety brake levers supported on the handlebars.

The present invention is broadly directed to a handlebar bag formed of a flexible material so that it may be compactly stored, formed with a unique suspension system which maintains the bag stable in all directions regardless of the contents of the bag. The suspension system is also universal so as to be highly adjustable and useful on any size handlebars yet it does not restrict the free use of the handlebars or attached brake or gear levers.

SUMMARY OF THE INVENTION

The present invention is broadly directed to an enclosed bag formed of flexible material and having access through an opening closed by a fastener such as a zipper. The preferred embodiment of the bag is generally cylindrical in shape. A pair of elongated handlebar straps each have one end affixed to the bag adjacent to its opposed ends. The straps have male hook and loop type (Velcro) fasteners on their free ends and a strip of female hook and loop fastener is affixed to the cylindrical surface of the bag between points at which the straps join the bag. The straps may thus be wrapped around the handlebars of the cycle and the free ends affixed in an adjustable manner to the fastener strip on the bag.

To securely support the bag about this axis of horizontal suspension, a pair of shock cords each have one end attached to the bottom of the bag, adjacent to the intersection between the ends and the cylindrical surface. The shock cords have hooks on their free ends adapted to attach to the front axle area of the cycle. A pair of flat, flexible webbing members are sewn to the sides of the bag between the point of attachment of the handlebar straps and the shock cords. The ends of the shock cords attach to the bag by D-rings affixed to the webbing. The webbing members act to distribute tensile forces exerted between the handlebar straps and the shock cords along the length of the bag. Thus they securely retain the bag in a stable position without distending the bag.

The hook and loop fasteners allow the point of attachment of the ends of the strap to the bag to be adjusted to control the tension of the handlebar mount. Since the straps are simply flatly wrapped around the handlebars they don't interfere with the handlebar grip or the brake lever action. This attachment arrangement is easy to engage and disengage and is not susceptible to loosening or distending by incidental forces applied to the bag. The fasteners on the ends of the straps may be of dissimilar types so that the strap ends may be joined together to form a shoulder loop or alternatively an accessory strap may be provided with Velcro fasteners at both of its ends to join the straps together in a shoulder harness arrangement. In the preferred embodiment of the invention a foam plastic sheet liner maintains the bag's cylindrical shape and serves as a padding for its contents.

Other objective, advantages and applications of the invention will be made apparent by the following detailed description of a preferred embodiment of the invention. The description makes reference to the accompanying drawings in which.

Figures 1, 2, 3:
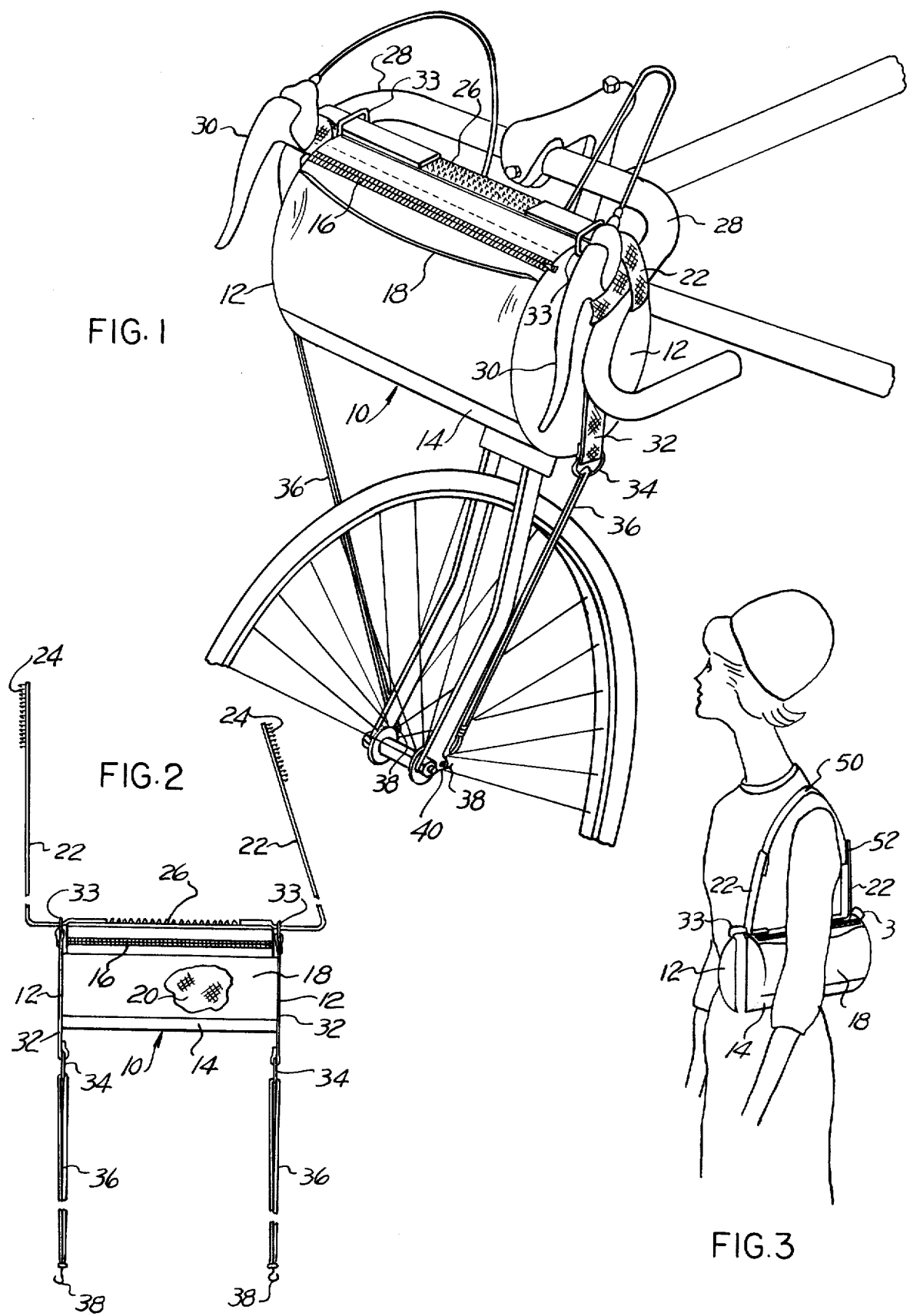
FIG. 1 is a perspective view of a handlebar bag formed in accordance with the present invention and secured to the handlebars and front axle of the bicycle.
FIG. 2 is a perspective view of the handlebar bag of FIG. 1, removed from the bicycle, and partially broken away for purposes of illustration.
FIG. 3 is a perspective view of the bag of FIG. 1, equipped with an auxiliary strap, and used as a shoulder bag.

The bag forming the preferred embodiment of the invention, generally indicated at 10, is cylindrical in shape, having a pair of spaced circular ends 12 joined by a cylindrical central section 14. The bag may be formed with any flexible sheet material such as canvas, nylon, or the like. The bag is preferably about 12 inches long as that size bag conveniently fits between the handlebars of most bicycles, and may have a diameter of about half of its length.

Access to the bag is through a zippered opening 16 extending the full length of the bag between the end sections 12. A rectangular pocket 18 of a stretchable fabric is also sewn to the bag, at its bottom and two of its sides, with its top open. Small articles may be easily inserted into the pocket from the top and are retained between the stretch fabric and the underlying bag material. As seen in FIG. 2 a sheet of foam plastic 20 having dimensions slightly smaller than the developed cylindrical surface 14 is disposed within the bag and acts to resiliently urge the bag into a cylindrical shape as well as to act as a protective cushion for the contents of the bag.

A pair of elongated straps 22 formed of woven nylon webbing each have one end fastened to the bag. One strap 22 is sewn to the cylindrical surface 14 adjacent to one end section 12 and the other strap is joined to the cylindrical section 14 adjacent to the opposed end section 12 so that the line between their points of joinder extends longitudinally along the surface 14. The straps are preferably each about 12 inches long and each has a section of hook and loop type fastener sewn to one side of its free end. A hook and loop fastener consists of a female fabric section having very closely spaced fabric loops and a male fabric section of short projecting fibers having hooked ends. When the male member is brought into contact with the female member many of the hooks engage the loops so as to retain the sections together. The sections may be removed by a peeling action but strongly resists forces imposed in the direction of the supporting fabrics. These fasteners are sold under the trademark "Velcro". They are unique in that they may be joined together in random orientation and do not require the exact orientation demanded by other two part separable fasteners such as buttons or snaps.

In the preferred embodiment of the invention sections 24 of hook fastener member are sewn to the ends of each of the straps. An elongated strip of the loop or female member is sewn to the cylindrical surface of the bag 14 so as to extend between the points at which the two straps 22 are fastened to the bag.

As shown in FIG. 1 the bags are attached to a set of handlebars 28 of a bicycle by wrapping the two straps 22 around opposed sections of the handlebar and then securing the free ends of the straps to the bag by bringing the fasteners 24 in contact with the section 26 adhered to the bag. Because of the versatile positioning of the hook and loop fasteners the rigidity of the retention does not depend upon the length of strap left over after wrapping around the handlebars. The straps 22 may be conveniently anchored in position on the handlebars by wrapping them around the bike's hand brake levers 30 or similar gear shift levers. The flat straps 22, unencumbered by buckles or the like, do not obstruct the handlebars or the levers so as to interfere with their normal use by the rider.

When both of the strap ends 22 are fastened to the hook fastener section 26 on the bag by their attached fastener sections 24, an intermediate section of the loop fastener 26 is normally left exposed. This section can be used to attach accessories, such as a map case, to the bag 10.

A pair of webbing sections 32 are sewn diametrically across the outer sides of the two circular bag ends 12 from points adjacent to the points of joinder of the straps 22 to the bags. The webbing sections 32 carry metal D-rings 34 at their ends opposite to the side of the bag carrying the straps 22. The pair of shock cords 36 each have one of their ends affixed to one of the D-rings 34. The shock cord consists of an elastic cord covered by woven synthetic material. The free ends of the shock cord 36 have rounded hooks 38 which are adapted to engage eyelets commonly attached to the front fork ends 40. The shock cords 36 are of such length that they are elastically extended to make this engagement and accordingly exert a downward force on the lower end of the bag 10. This force takes up any slack which may exist in the straps 32 and resiliently stabilizes the bag in its position between and below the handlebars. The webbings 32 act to prevent the tensile forces imposed on the bottom of the bag by the shock cords 36 from distending the bag downwardly but rather distribute the downward force over the entire side of the bag so as to retain the side flat.

The webbing sections 32 carry rectangular metal rings 33 at their upper ends, adjacent to the point of attachment of the bag carrying straps 22. The straps 22 are normally passed through the rings 33 before being wrapped about the handlebars 28. The free ends of the straps 22 are also passed back through the rings before being attached to the Velcro material 26. Thus, any forces exerted on the Velcro fasteners 24 and 26 are in a direction of shear and it is extremely difficult to separate the two fastener elements with forces exerted in this direction. The rings 33 also act to exert the downward pull of the shock cords 36 directly on the handlebar attaching straps 22. In this manner, the shock cords 36 act to pull the straps 32 downwardly to create a stable yet resilient framework for supporting the bag 12.

With the bag 10 thus supported on the bicycle the rider can conveniently insert and remove articles from the zipper opening 16 and the pocket 18 without demounting from the cycle. The bag can be conveniently attached and detached from the bicycle in a matter of seconds and when in position is substantially immune to accidental displacement.

The straps 22 can be conveniently converted into a shoulder strap by employing an accessory strap section 50 which has sections of loop type fastener 52 adhered to each of its ends. These sections are adapted to engage the hook fasteneres 24 formed at the free ends of the straps 22 so as to join the three sections in a continuous loop which may act as a shoulder strap. Alternatively, the fastener 24 formed at the free end of the strap 22 might be made of dissimilar configuration and suitable changes might be made in the fastener strip 26 formed on the bag. Then the strap sections 22 could be joined together without an intermediate section, forming a shorter shoulder strap.

The handlebar bag of the present invention is therefore seen to be simple in construction so as to be low in initial cost; adaptable to easy attachment and removal from the bicycle and alternative use as a shoulder bag.

The embodiments of the invention in which an exclusive property or privilege is claimed are defined as follows:

1. An article carrier adapted to be supported on the handlebars of a cycle and stabilized by the front axle of the cycle, comprising: an enclosed bag having an access opening; closure means associated with the opening; a pair of elongated flexible straps each having one end affixed to the bag at one of a pair of spaced points and adapted to be secured to the opposed handlebars so that the line on the bag between the points of attachment of the straps is suspended substantially horizontally; a pair of elongated flexible members each having one end fixed to the bag at one of a pair of connecting means on the bottom surface of the bag, the connecting means being spaced from one another and from the points of attachment of the straps to the bag; and connector means attached to the free end of each flexible member to secure the elastic member adjacent to the front axle area of the cycle so as to suspend the bag between and below the handlebars.

2. The carrier of claim 1 wherein the bag consists of a pair of round end sections joined by a central cylindrical section and the straps are attached to a pair of spaced points on the cylindrical section adjacent to the two ends so that the line between the points extend along the cylindrical section parallel to the central axis of the bag.

3. The carrier of claim 2 wherein the elongated flexible members are attached to the bag substantially at the intersection between the ends and the cylindrical section at points diametrically opposed to the points of attachment of the straps to the bag.

4. The carrier of claim 3 wherein the bag is formed of flexible sheet material and a pair of reinforcing straps are attached to the outer surfaces of the ends of the bag, each extending between a point of attachment of one of the elongated flexible members of the bag and a point of attachment of one of the straps to the bag.

5. The carrier of claim 4 wherein the elongated flexible members are attached to the bag through a pair of ring members one secured to each of said reinforcing straps.

6. The carrier of claim 1 wherein the free end of each strap is provided with a fastener member adapted to be secured to a complementary fastener member attached to the bag adjacent to the point of connection of that strap to the bag, whereby the straps may be wrapped around the handlebars and secured by joining the fasteners on the free ends to the complementary fastener members on the bag.

7. The carrier of claim 6 wherein the fasteners attached to the free ends of the straps comprise one form of hook and loop fasteners and the complementary fastener members attached to the bag consist of the other form of hook and loop fasteners.

8. The carrier of claim 7 wherein the complementary fastener members attached to the bag consist of a single elongated strip of hook and loop fastener material extending substantially the full length of the bag between the opposite ends.

9. An article carrier adapted to be supported between the handlebars of a cycle or alternatively used as a shoulder bag, comprising an enclosed flexible bag having an access section adapted to be secured by a closure member; a pair of elongated straps each having one end affixed to the bag at a pair of points spaced along the surface of the bag; first fastener members affixed to the free ends of each of the straps; second fastener members secured to the bag adjacent to the point of attachment of each of the straps to the bag, whereby the strap members may be wrapped about the handlebars of the cycle and the free ends joined to the bag so as to secure the bag between the handlebars; and a flexible elongated connector section having third fastener members on its ends adapted to connect to said first fastener members to form a shoulder bag.

10. The carrier of claim 9 wherein the first, second and third fastener members are of the hook and loop type.

* * * * *

UNITED STATES PATENT OFFICE
CERTIFICATE OF CORRECTION

Patent No. 3,955,728              Dated May 11, 1976

Inventor(s) W. Shaun Jackson and Leslie Eric Bohm

It is certified that error appears in the above-identified patent and that said Letters Patent are hereby corrected as shown below:

Column 4, line 48 "elastic" should be --flexible--;
Column 4, line 55 "extend" should be --extends--.

Signed and Sealed this

Seventh Day of September 1976

[SEAL]

Attest:

RUTH C. MASON
*Attesting Officer*

C. MARSHALL DANN
*Commissioner of Patents and Trademarks*